(12) United States Patent  
Li

(10) Patent No.: US 8,338,013 B2
(45) Date of Patent: Dec. 25, 2012

(54) ELECTRONIC DEVICE

(75) Inventor: Chang-Zhi Li, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 705 days.

(21) Appl. No.: 12/499,952

(22) Filed: Jul. 9, 2009

(65) Prior Publication Data

US 2010/0159311 A1 Jun. 24, 2010

(30) Foreign Application Priority Data

Dec. 18, 2008 (CN) .......................... 2008 1 0306354

(51) Int. Cl.
*H01M 2/10* (2006.01)

(52) U.S. Cl. ............. 429/96; 429/97; 429/100; 429/175

(58) Field of Classification Search ................... 429/96, 429/97, 100, 121, 175
See application file for complete search history.

(56) References Cited

U.S. PATENT DOCUMENTS 6,370,362 B1 * 4/2002 Hansen et al. ............... 455/90.1
2007/0048599 A1 * 3/2007 Choi ............................. 429/97

FOREIGN PATENT DOCUMENTS

CN 1925333 A 3/2007

* cited by examiner

*Primary Examiner* — Patrick Ryan
*Assistant Examiner* — Ben Lewis
(74) *Attorney, Agent, or Firm* — Altis Law Group, Inc.

(57) ABSTRACT

An electronic device includes a main body and a cover. The main body includes an elastic latch. The latch has a latching opening. The cover is coupled to the main body and forms a receiving tab. The latch is at least partially deformable to allow the receiving tab to enter the latch opening and engage the latch.

17 Claims, 4 Drawing Sheets

ELECTRONIC DEVICE

BACKGROUND

1. Technical Field

The present disclosure generally relates to electronic devices, and particularly to an electronic device with a battery cover fastened to a main body.

2. Description of Related Art

Electronic devices, such as computers and mobile phones, are widely used. The electronic devices generally have internal batteries to supply power. The batteries are housed within the electronic devices.

A typical electronic device includes a main body and a battery cover. The battery cover forms a pair of hooks, and the main body defines a receptacle to receive a battery. Sidewalls of the receptacle define a pair of slots. The hooks of the battery cover are engaged in the slots retaining the battery in the receptacle. However, the hooks are easily abraded, such that the battery cover does not tightly couple on the main body. The battery may, as a result, be unable to make contact with components in the main body effectively, thereby interrupting the power supply.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
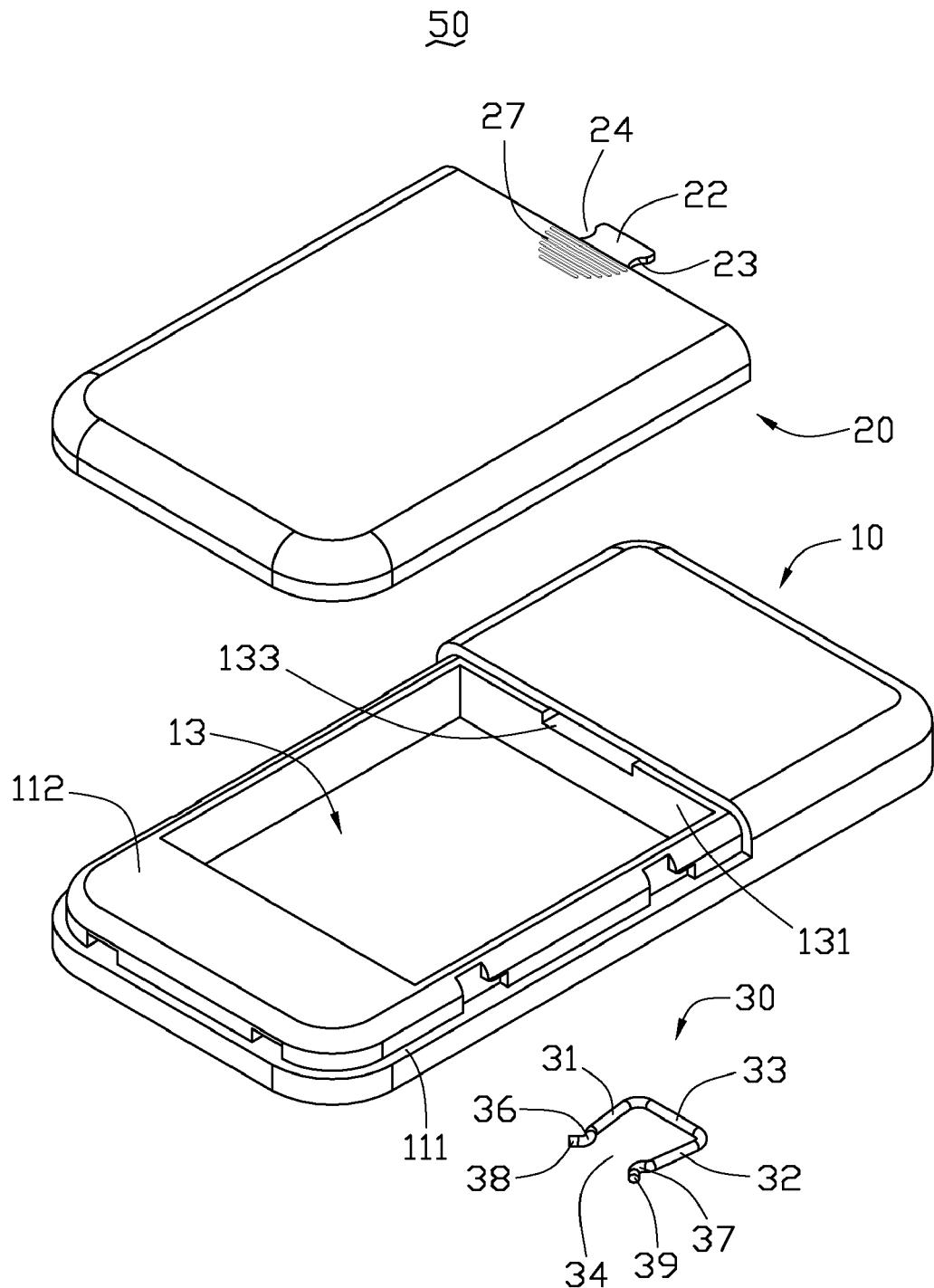
FIG. 1 is an exploded, perspective view of an embodiment of an electronic device including a main body and a battery cover.
Figure 2:
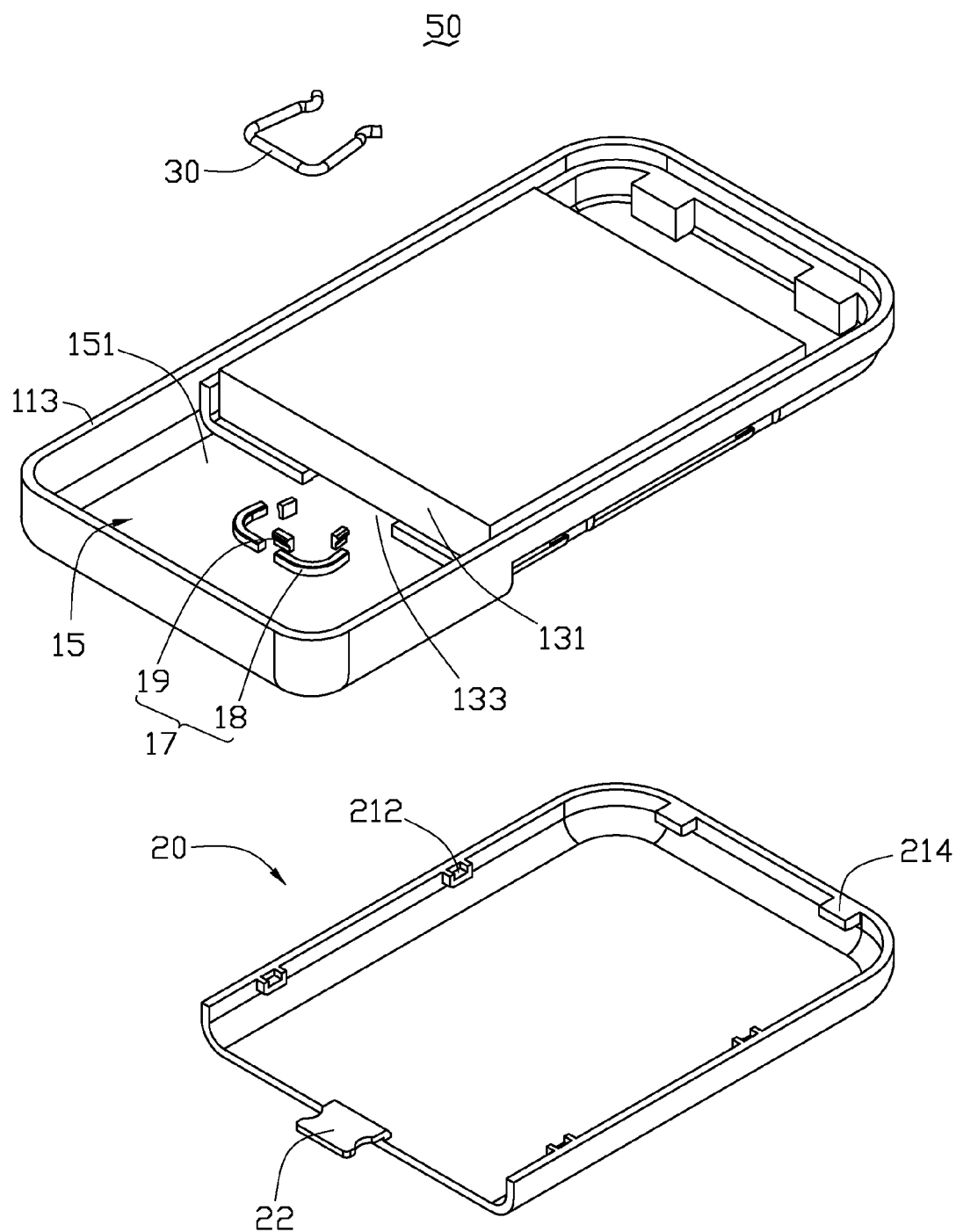
FIG. 2 is an exploded, perspective view of the electronic device of FIG. 1, viewed from another aspect.
Figure 3:
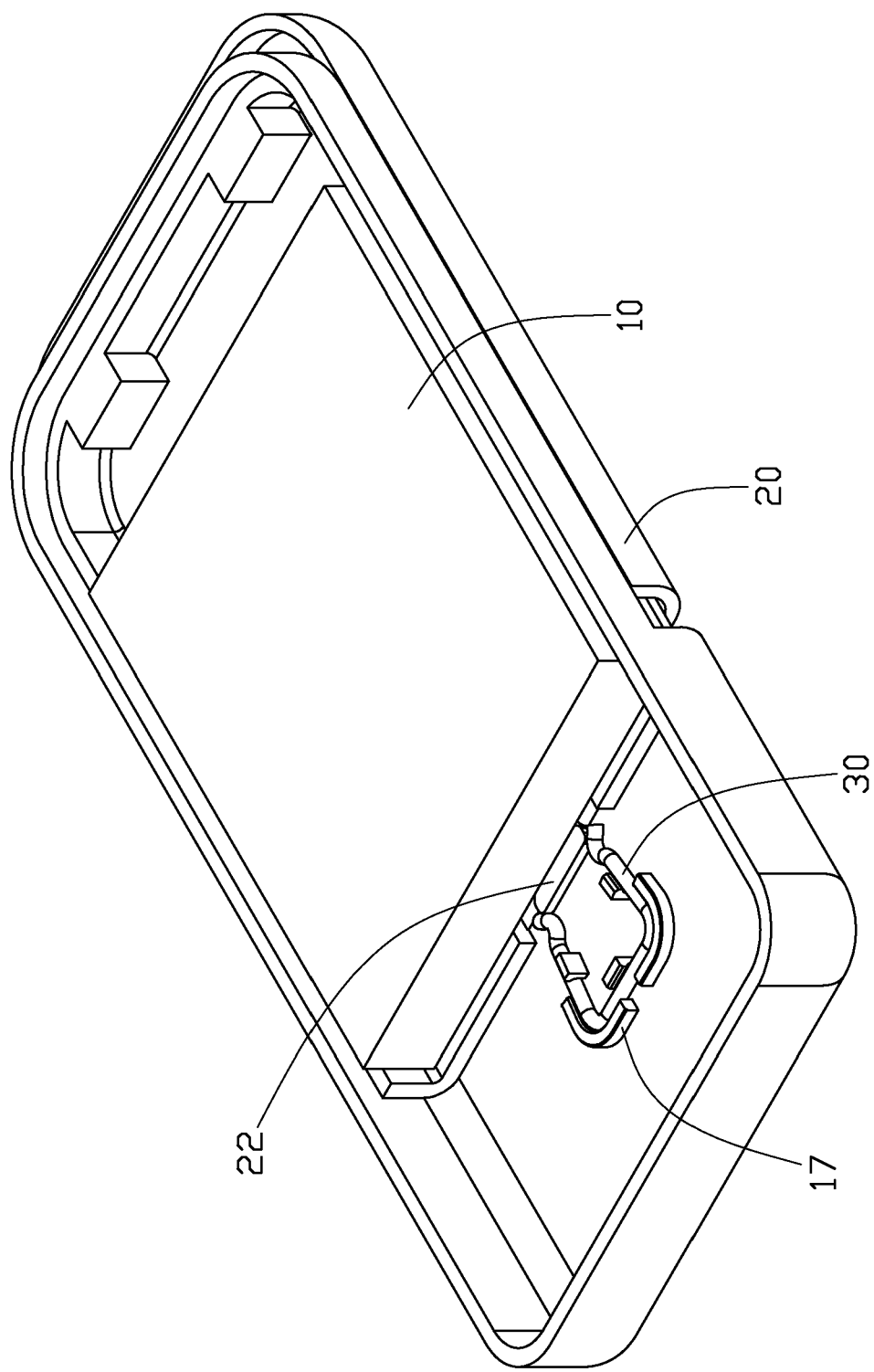
FIG. 3 is a perspective view of the electronic device of FIG. 1, showing the battery cover coupled but not latched to the main body.
Figure 4:
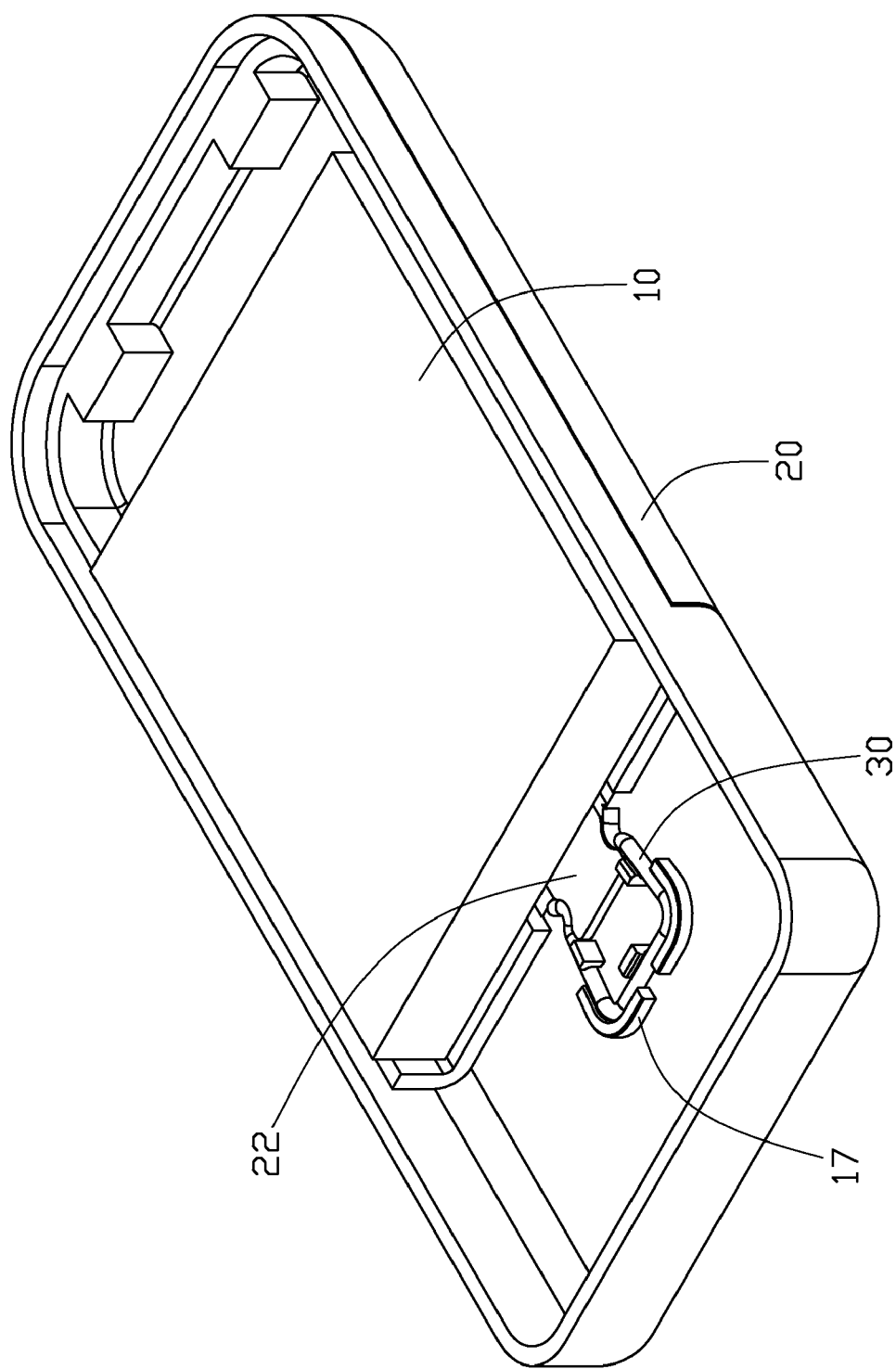
FIG. 4 is a perspective view of the electronic device of FIG. 1, showing the battery cover coupled and latched to the main body.

Referring to FIG. 1 and FIG. 2, an exemplary embodiment of an electronic device 50 is shown. In the illustrated embodiment, the electronic device 50 can be a mobile phone, but may alternatively be a PDA (personal digital assistant), notebook, or other device. The electronic device 50 includes a main body 10, a battery cover 20, and a latch 30. A battery (not shown) is received in the main body 10 and retained by the battery cover 20.

The main body 10 includes a guide rail 111 formed on opposite sidewalls of the main body 10, a first surface 112, and a second surface 113 opposite to the first surface 112. The main body 10 defines a receptacle 13 in the first surface 112 to receive the battery, and a mounting space 15 in the second surface 113 to receive the latch 30. The main body 10 defines at least one engaging hole 115 in a sidewall between the sidewalls forming the guide rail 111. The main body 10 includes a sidewall 131 between the receptacle 13 and the mounting space 15 to separate the receptacle 13 and the mounting space 15. The sidewall 131 defines an opening 133 to communicate the receptacle 13 with the mounting space 15. The main body 10 has a bottom wall 151 in the mounting space 15. The bottom wall 151 forms a holding portion 17 to hold the latch 30. In the illustrated embodiment, the holding portion 17 includes two symmetrical elongated strips 18 and three protrusions 19. Each protrusion 19 has a hook (not labeled) at a top end. Alternatively, the strips 18 may be formed integrally as one and two or more of the protrusions 19 may also be formed integrally as one. The strips 18 may be L-shaped or other shape.

The battery cover 20 forms a plurality of projections 212 on its opposite edges. The battery cover 20 further forms at least one engaging hook 214 and a receiving tab 22 on its other opposite edges. The receiving tab 22 is opposite to the engaging hook 214. The other two opposite edges are connected to the edges forming the projections 212. The receiving tab 22 has high strength and is difficult to damage. The receiving tab 22 defines a first cutout 23 and a second cutout 24. The battery cover 20 forms an operating portion 27 adjacent to the receiving tab 22 to facilitate operation of the battery cover 20 by a finger of a user. In the illustrated embodiment, the operating portion 27 includes a plurality of parallel elongated protrusions.

The latch 30 includes a first latching portion 31, a second latching portion 32, and a connecting portion 33 connecting the first and second latching portions 31, 32. The first and second latching portions 31, 32 are bent from opposite ends of the connecting portion 33, and define a latching opening 34 therebetween. A first bent portion 36 extends inward from an end of the first latching portion 31, and a second bent portion 37 extends inward from an end of the second latching portion 32. A first guide portion 38 and a second guide portion 39 extend from ends of the first and second bent portions 36, 37 correspondingly. The first and second guide portions 38, 39 are bent outwards. As such, the latch 30 is $\Omega$-shaped.

Referring to FIG. 1 through FIG. 4, during assembly of the electronic device 50, with the latching opening 34 facing the receptacle 13, the latch 30 is positioned between the elongated strips 18 and the protrusions 19, thereby held by the holding portion 17. The battery cover 20 is coupled on the first surface 112 of the main body 10 and slid with the projections 212 of the battery cover 20 on the guide rail 111. The receiving tab 22 slides through the opening 133 and engages the latch 30. Once first and second bent portions 36, 37 engage the first cutout 23 and the second cutout 24 correspondingly, the battery cover 20 stops sliding and the battery cover 20 is assembled to the main body 10. During sliding, the receiving tab 22 of the battery cover 20 is guided by the first and second guide portions 38, 39 and deforms the latch 30. The at least one engaging hook 214 is engaged in the at least one engaging hole 115.

When a battery is to be installed in or removed from the electronic device 50, force applied on the battery cover 20, preferably on the operating portion 27, impels the receiving tab 22 to deform and disengage from the latch 30, thus the battery cover 20 is disassembled. The battery is received in the receptacle 13 and battery cover 20 reattached to the main body 10 as described.

The battery cover 20 is latched on the main body 10 by engagement of the latch 30 and the receiving tab 22. Therefore, even if the receiving tab 22 is abraded, the latch 30 can still firmly engage the receiving tab.

Alternatively, the first and second cutouts 23, 24 may be replaced by protrusions, and the first and second bent portions 36, 37 bent outwards accordingly. The battery cover 20 is not limited to cover a battery.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising:
a main body comprising an elastic latch, the latch comprising a first latching portion, a second latching portion, and a connecting portion connecting the first latching portion and the second latching portion, the first and second latching portions being bent from opposite ends of the connecting portion, and defining a latching opening therebetween; and
a cover coupled to the main body, the cover forming a receiving tab;
wherein at least the first latching portion or the second latching portion of the latch is deformable such that when assembling the electronic device, the battery cover slides on the main body, the receiving tab enters into the latching opening to engage the latch; and when removing the battery cover, the receiving tab disengages from the latch.

2. The electronic device of claim 1, wherein one of the receiving tab of the cover and the latch forms a protrusion, and the other defines a cutout to engage the protrusion.

3. The electronic device of claim 2, wherein the receiving tab is formed on an edge of the cover and defines two cutouts; a first bent portion extends inward from an end of the first latching portion, and a second bent portion extends inward from an end of the second latching portion, the first and second bent portions acting as the protrusions engaging the cutouts of the latch.

4. The electronic device of claim 3, wherein a first guide portion and a second guide portion extend from ends of the first and second bent portions correspondingly, bent outwards to guide the receiving tab into the latching opening.

5. The electronic device of claim 1, wherein the main body forms a holding portion to hold the latch.

6. The electronic device of claim 5, wherein the holding portion comprises at least one strip and at least one protrusion; with the latch positioned therebetween.

7. The electronic device of claim 1, wherein the main body comprises a guide rail formed on opposite sidewalls of the main body; and the cover forms a plurality of projections on two opposite edges to slide in the guide rail of the main body.

8. The electronic device of claim 7, wherein the main body further comprises first and second surfaces opposite to each other, the main body defines a receptacle in the first surface to receive the battery, and a mounting space in the second surface to receive the latch, the main body comprises a sidewall between the receptacle and the mounting space to separate the receptacle and the mounting space, the sidewall defines an opening to communicate the receptacle with the mounting space; and the receiving tab passes through the opening to engage the latch.

9. The electronic device of claim 8, wherein the main body defines at least one engaging hole in a sidewall between the sidewalls forming the guide rail; the cover further forms at least one engaging hook to engage the at least one engaging hole.

10. An electronic device, comprising:
a main body defining a receptacle, an elastic latch and at least one engaging portion positioned at opposite sides of the receptacle; and
a cover coupled to the main body to cover the receptacle, the cover forming a receiving tab to engage the latch and at least one engaging portion to engage the at least one engaging portion of the main body at opposite ends of the cover;
wherein the latch comprises a first latching portion, a second latching portion, and a connecting portion connecting the first and second latching portions, the first and second latching portions are bent from opposite ends of the connecting portion and define a latching opening therebetween, the first and second latching portions are capable of nearing or separating from each other such that when assembling the electronic device, the battery cover slides on the main body, the receiving tab enters into the latching opening to engage the latch; and when removing the battery cover, the receiving tab disengages from the latch.

11. The electronic device of claim 10, wherein the receiving tab of the cover defines two cutouts; the latch further comprises a first bent portion extending inwards from an end of the first latching portion and a second bent portion extending inwards from an end of the second latching portion, the first and second bent portions act as the protrusion engaging with the cutouts of the latch.

12. The electronic device of claim 11, wherein a first guide portion and a second guide portion extend from ends of the first and second bent portions correspondingly, the first and second guide portions are bent outwards to guide the receiving tab to enter the latching opening.

13. The electronic device of claim 10, wherein the main body forms a holding portion to hold the latch.

14. The electronic device of claim 13, wherein the holding portion comprises at least one strip and at least one protrusion, between which the latch is positioned.

15. The electronic device of claim 14, wherein the main body further comprises opposite first and second surfaces, the receptacle in the first surface to receive a battery, and a mounting space in the second surface to receive the latch, the main body comprising a sidewall between the receptacle and the mounting space to separate the two, the sidewall defines an opening to communicate the receptacle with the mounting space; the receiving tab passes through the opening to engage the latch.

16. The electronic device of claim 10, wherein the main body comprises a guide rail formed on opposite sidewalls of the main body; and the cover forms a plurality of projections on two opposite edges on which slide the main body.

17. The electronic device of claim 16, wherein the at least one engaging portion of the main body is at least one engaging hole defined in a sidewall between the sidewalls forming the guide rail; the at least one engaging portion of the cover is at least one engaging hook formed at an edge of the cover.

* * * * *